US012420122B2

(12) United States Patent
Burke

(10) Patent No.: US 12,420,122 B2
(45) Date of Patent: Sep. 23, 2025

(54) ANCHOR DEVICE

(71) Applicant: Pure Safety Group, Inc., Pasadena, TX (US)

(72) Inventor: Craig Burke, Sydney (AU)

(73) Assignee: Pure Safety Group, Inc., Pasadena, TX (US)

(*) Notice: Subject to any disclaimer, the term of this patent is extended or adjusted under 35 U.S.C. 154(b) by 522 days.

(21) Appl. No.: 17/766,635

(22) PCT Filed: Nov. 3, 2020

(86) PCT No.: PCT/GB2020/052786

§ 371 (c)(1),
(2) Date: Apr. 5, 2022

(87) PCT Pub. No.: WO2021/089998

PCT Pub. Date: May 14, 2021

(65) Prior Publication Data

US 2023/0158347 A1 May 25, 2023

Related U.S. Application Data

(60) Provisional application No. 62/930,124, filed on Nov. 4, 2019.

(51) Int. Cl.
*A62B 35/00* (2006.01)

(52) U.S. Cl.
CPC ................................ *A62B 35/0068* (2013.01)

(58) Field of Classification Search
CPC .................................................. A62B 35/0068

(Continued)

(56) References Cited

U.S. PATENT DOCUMENTS 4,643,377 A * 2/1987 Christianson ........ A63B 29/024 248/231.9
4,645,149 A * 2/1987 Lowe .................. A63B 29/024 248/231.9

(Continued)

FOREIGN PATENT DOCUMENTS

EP 1558342 B1 11/2011
WO 1999/064110 A1 12/1999

(Continued)

OTHER PUBLICATIONS

International Search Report and Written Opinion mailed Feb. 8, 2021 for corresponding International Patent Application No. PCT/GB2020/052786.

*Primary Examiner* — Kimberly T Wood
(74) *Attorney, Agent, or Firm* — Dicke, Billig & Czaja, PLLC

(57) ABSTRACT

An anchor device may be connected to a personal safety line used by a worker, who typically is wearing a safety harness to which the line is attached. The worker may insert an anchoring mechanism portion of the anchoring device into a connection point, then activate a locking feature of the anchoring mechanism to affix it to the connection point. The locking feature comprises multiple jaws which are coupled to each other and to the apparatus so that they expand when tension is applied to the connection point of the personal safety line. The worker, secured in case of fall by the personal safety line, may move about freely, but should a fall occur, the added tension on the personal safety line will increase the force locking the mechanism to the connection point, thus increasing safety. To release the anchoring mechanism, the worker disengages or otherwise unlocks the anchoring mechanism.

22 Claims, 6 Drawing Sheets

(58) Field of Classification Search
USPC ............................................. 248/925; 182/3
See application file for complete search history.

(56) References Cited

U.S. PATENT DOCUMENTS

| | | | | | |
|---|---|---|---|---|---|
| RE33,104 | E * | 10/1989 | Taylor | A63B 29/024 248/231.9 |
| 6,729,821 | B2 | 5/2004 | Guthrie et al. | |
| 6,736,359 | B2 * | 5/2004 | Murray | A63B 29/024 482/37 |
| 6,834,745 | B2 | 12/2004 | Vandelinde | |
| 7,011,281 | B2 | 3/2006 | Guthrie et al. | |
| 7,278,618 | B2 * | 10/2007 | Tusting | A63B 29/024 248/231.91 |
| 7,357,363 | B2 | 4/2008 | Guthrie et al. | |
| 7,959,199 | B2 * | 6/2011 | Horiuchi | B25J 15/0009 901/38 |
| 8,353,653 | B2 | 1/2013 | Guthrie et al. | |
| 8,839,591 | B2 | 9/2014 | Guthrie et al. | |
| 9,370,692 | B2 * | 6/2016 | Czech | A63B 29/024 |
| 10,143,892 | B2 * | 12/2018 | Baker | H04B 1/3888 |
| 10,463,916 | B2 * | 11/2019 | Davidson | A63B 29/024 |
| 2003/0019321 | A1 * | 1/2003 | Apezetxea | A63B 29/024 74/567 |
| 2004/0074695 | A1 * | 4/2004 | Henry | A62B 35/0068 182/3 |
| 2009/0134294 | A1 * | 5/2009 | Hemsley | A63B 29/024 248/231.9 |
| 2022/0258010 | A1 * | 8/2022 | Vianini | A63B 29/024 |

FOREIGN PATENT DOCUMENTS

| | | | | |
|---|---|---|---|---|
| WO | 2004/035140 | A1 | 4/2004 | |
| WO | WO-2005012650 | A2 * | 2/2005 | A63B 29/024 |
| WO | 2017/174808 | A1 | 10/2017 | |

* cited by examiner

ANCHOR DEVICE

CROSS-REFERENCE TO RELATED APPLICATIONS

This application claims the benefit of U.S. Provisional Patent Application Ser. No. 62/930,124, filed Nov. 4, 2019, which is incorporated in its entirety herein by reference.

BACKGROUND

This application pertains to attachment of personal safety (or "fall prevention") lines to connection points, such as those which may be employed on structures such as cargo containers typically transported in the holds and on the decks of cargo ships. Devices of this type commonly have a proximal handle-based mechanism gripped by a worker, and a long wand extending from the handle to a distal anchoring mechanism on the other end of the wand. A personal safety line connects the worker (who typically is wearing a safety harness to which the line is attached) and the anchoring mechanism. To avoid the need for the worker to approach the edge of the container and reduce the risk falling from the container, the worker uses the length of the wand to insert the mechanism into the connection point from a distance, then activates a locking feature of the mechanism to affix the anchoring mechanism to the connection point. The worker, secured in case of fall by the personal safety line, may move about the top of the container. To release the anchoring mechanism, the worker uses the handle to disengage or otherwise unlock the anchoring mechanism.

SUMMARY

In one embodiment, an anchor device comprises an anchoring mechanism. The anchoring mechanism comprises a connection point for a personal safety line, and multiple jaws coupled to each other to expand when tension is applied to the connection point. The multiple jaws contract when compression is applied to the connection point, typically manually; or when a cable is employed to apply force to the connection point in the opposite direction, essentially compressing the cable.

In another embodiment, an anchor device comprises a hollow wand, a handle-based mechanism connected to a proximal end of the wand, and an anchoring mechanism connected to a distal end of the wand. A cable is connected to the handle-based mechanism and runs within the hollow wand. The other end of the cable is connected to the anchoring mechanism. The anchoring mechanism comprises a connection point for a personal safety line, and multiple jaws coupled to each other to expand when tension is applied to the connection point. The multiple jaws contract when tension is applied to the cable within the wand.

BRIEF DESCRIPTION OF THE DRAWING

FIG. 3 illustrates an unlocked state and FIG. 4 represents a locked state.

DETAILED DESCRIPTION

The particular embodiments described in this application are only examples of possible implementation of the principles first disclosed here. In particular, the dimensions implied by the embodiments are only illustrative and not definitional unless specifically noted as such. All of the text appearing on the figures is incorporated by reference as if set out in full below.

An example of a known anchor device is a wand anchor shown in U.S. Pat. No. 6,834,745 (Vandelinde), the entire contents of which are incorporated by reference only for purposes of providing context, vocabulary, and background to the problem solved by the subject of this application.

Figure 7:
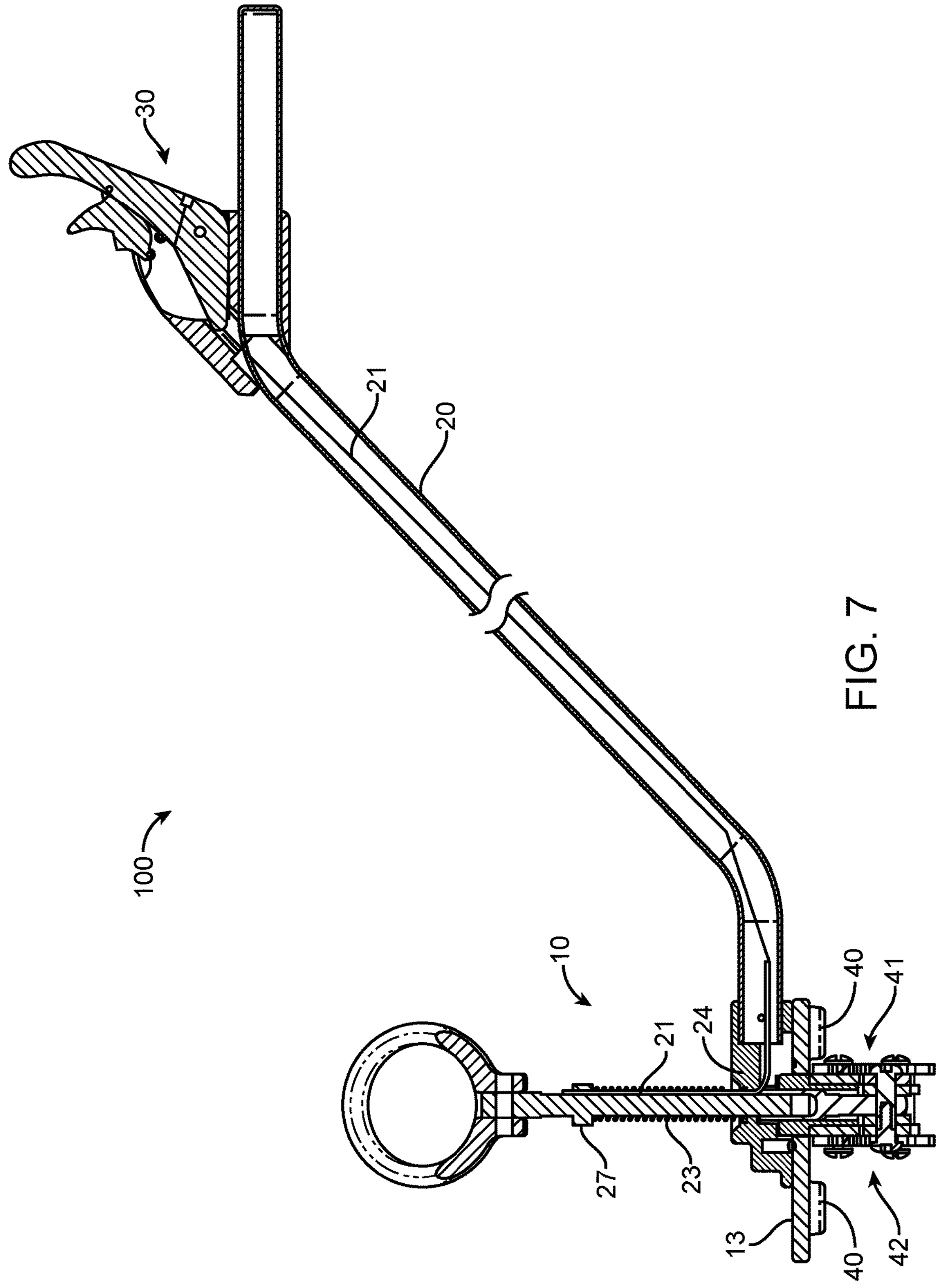
FIG. 7 is a side cross-sectional view of an embodiment of a wand anchor as a whole.

Referring briefly to FIG. 7, an embodiment of an anchor device 100 comprises an anchoring mechanism 10, an optional wand 20 and an optional handle 30. The anchoring mechanism 10 and handle 30 are connected to distal and proximal ends of wand 20, respectively. The embodiment of FIG. 7 is particularly preferred in the cargo container situation described above. However, in other applications, anchoring mechanism 10 may be employed alone, that is, without wand 20 and handle 30. If used, wand 20 is typically about three feet in length to provide a worker with a safe distance between their location at the handle 30 and the intended or actual location of the anchoring mechanism 10 which is adjacent the edge of a container, potentially at dangerous height above the ship deck or water surface. Regardless of length, wand 20 is hollow and has running within itself a release cable 21 which is mechanically connected to anchoring mechanism 10 and handle 30 as described further below. A personal safety line (not shown) may connect the worker (not shown), wearing a safety harness to which the personal safety line is attached, and the anchoring mechanism 10. As depicted in FIG. 7, the worker has inserted mechanism 10 into a connection point (not shown), and put the mechanism into its locked position, as explained further below.

Figure 1:
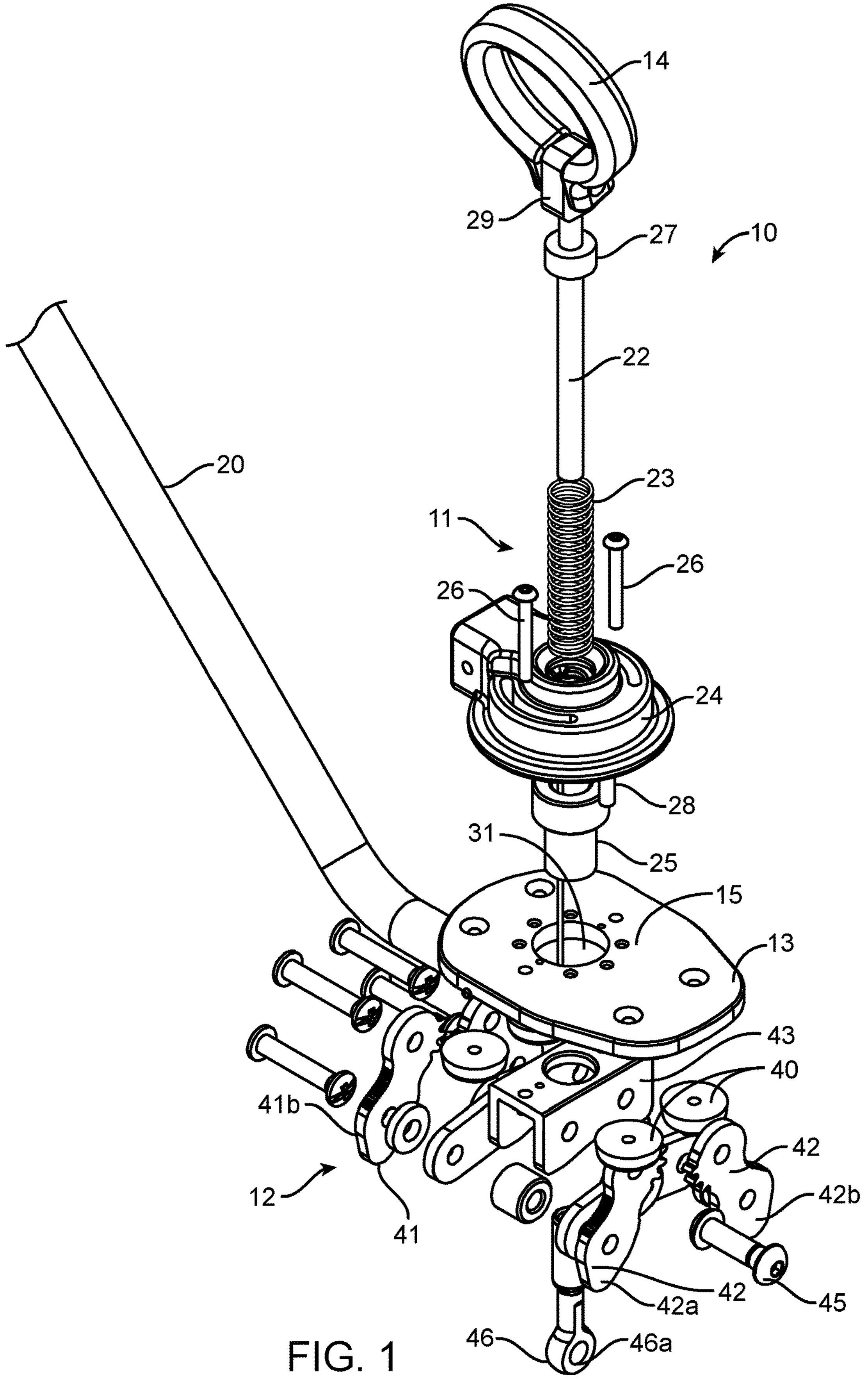
FIG. 1 is a perspective exploded view of a portion of one embodiment.
Figure 2:
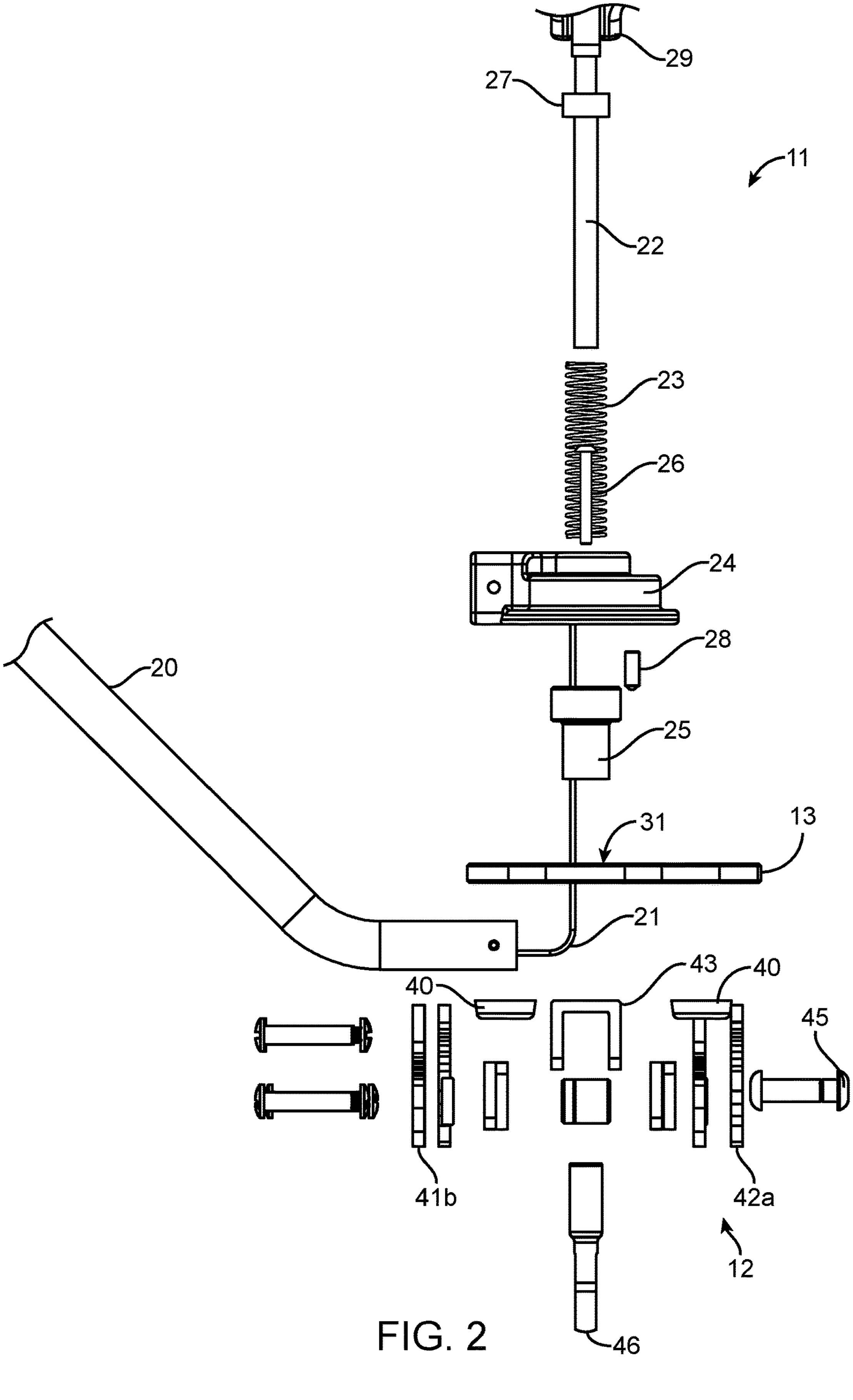
FIG. 2 is a right side exploded view of the portion of the embodiment of FIG. 1.
Figure 4:
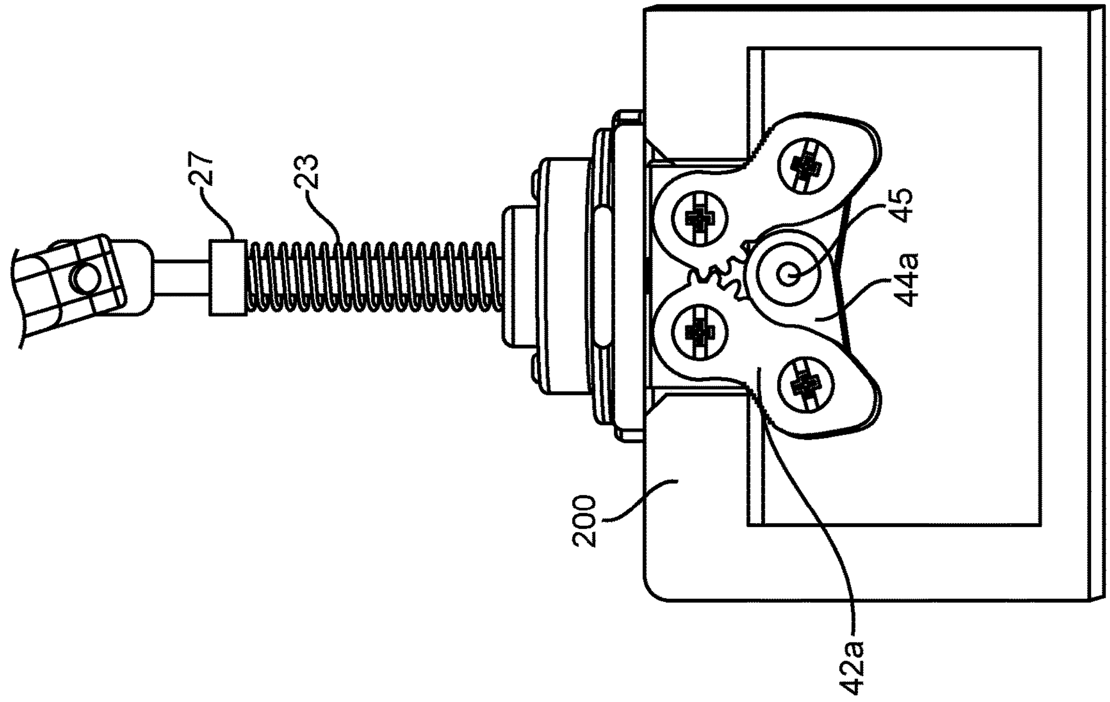
FIGS. 3 and 4 are respective front views of the portion of FIGS. 1 and 2 shown inserted into a connection point.
Figure 3:
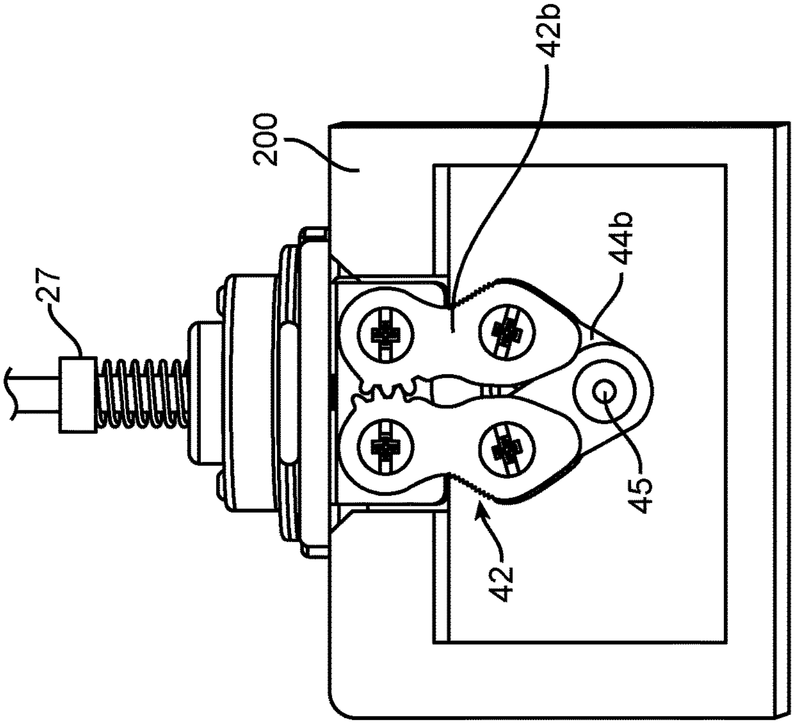
Figure 6:
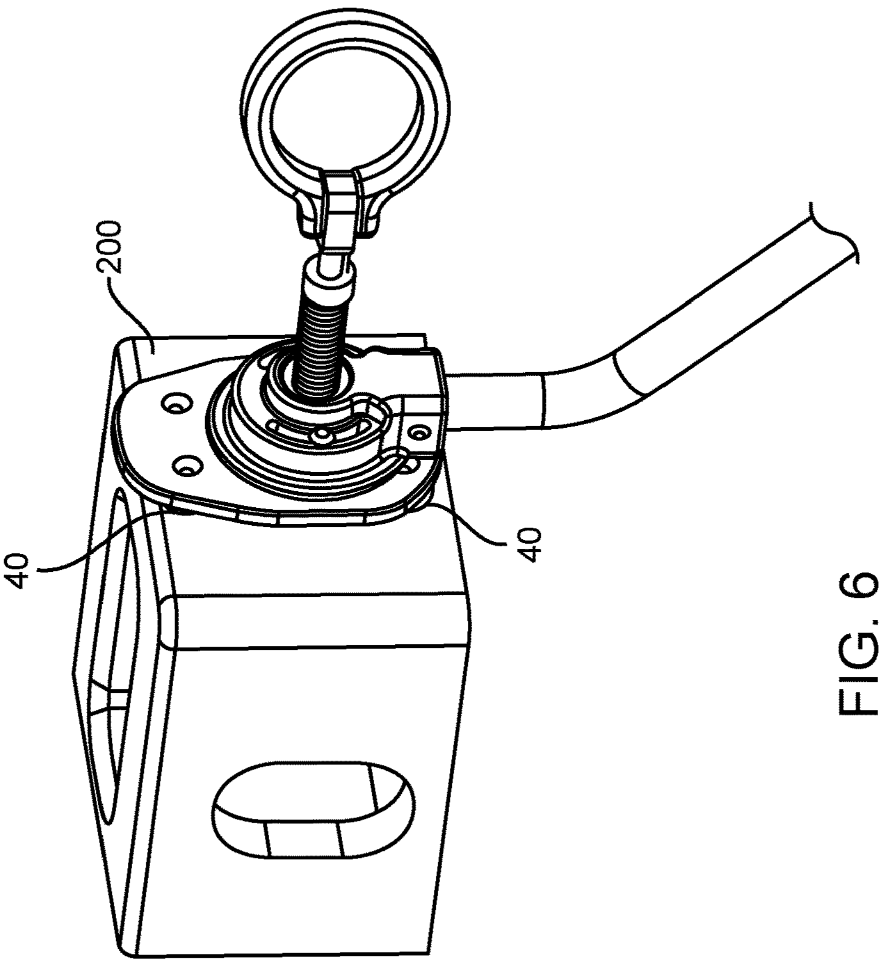
FIG. 6 is a perspective view of the embodiment of FIGS. 3-5 shown inserted and locked into an alternative location on a connection point.
Figure 5:
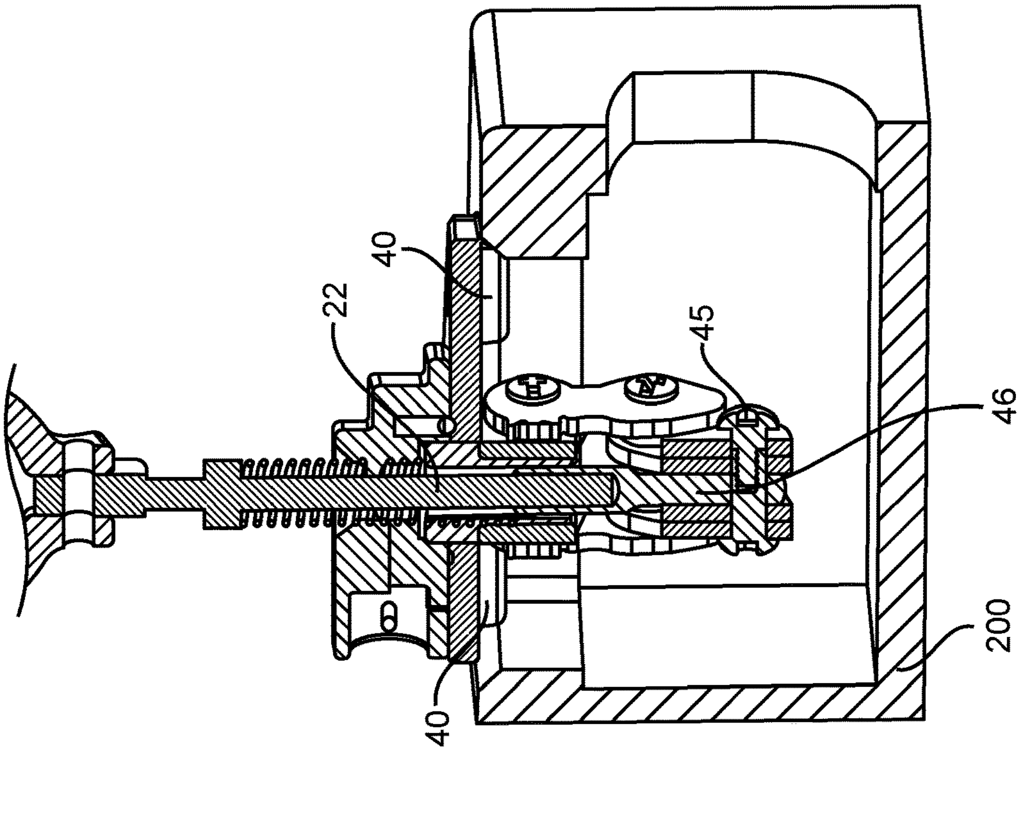
FIG. 5 is a partial cutaway and cross-sectional perspective view of the inserted, unlocked state of FIG. 3.

Turning to FIGS. 1-6, anchoring mechanism 10 is attached to the distal end of wand 20 and may be generally described as comprising an upper portion 11 and a lower portion 12 separated by a mounting plate 13. In general, lower portion 12 is inserted into a structure 200 until mounting plate 13 rests upon the structure 200. One advantage of the embodiment illustrated in the Figures is that it may be employed at multiple locations on a connection point, as best illustrated by considering FIGS. 3-5 as compared to FIG. 6. FIGS. 3-5 show a connection to the upper face of the structure while FIG. 6 shows a connection to the side face of the same structure. To accommodate these different locations, optional bumpers 40 lie on opposite sides of the lower surface of mounting plate 13. Bumpers 40 may be sized and positioned so that they touch the outer face of structure 200 when a relatively smaller opening is used to engage structure 200, as illustrated in FIG. 6; and further so that they fit inside the opening of structure 200 when a relatively larger opening is used to engage structure 200, as illustrated in FIG. 5. The bumpers 40 may be sized and positioned so that they contact structure 200 when inside the opening to provide a more secure fit.

Referring specifically to FIGS. 1 and 2, upper portion 11 comprises a ring 14, which is coupled (preferably by a pivot mount 29) to a central shaft 22. Central shaft 22 is biased by spring 23 between collar 27 and upper mount 24. A central collet 25 fits underneath upper mount 24 within central opening 31 of mounting plate 13. Upper mount 24 is designed to be attached (such as by two screws 26 or equivalent means) to mounting plate 13 such that it may pivot in the plane of mounting plate 13. Specifically, handle 30 and wand 20, if used, may be operated "left" and "right" within a range of ±45 degrees from a neutral position during use. Thus, the device as a whole may be used to access connection points on left or right corners of containers. This enables the worker to deploy the device when they are not proximate either edge of the container, to reduce the risk of falling, and then rotate the wand to either side so that it is out of the worker's way. When the worker desires, they may rotate the wand back to the neutral position, then deploy the handle 30 so that release cable 21 causes the anchoring mechanism 10 to disengage. A spring-biased pin 28 combines with various detent points 15 on the upper surface of mounting plate 13 to fix the position of the wand 20 along the angle of rotation.

Referring briefly again to FIG. 7, upper mount 24 is also designed to accept and pivotably attach wand 20, such as by a cotter pin or the like. The pin allows wand 20 to pivot to a vertical position when desired. Release cable 21 passes from the interior of wand 20 through the interior of upper mount 24, and then upward within spring 23 along central shaft 22, to a point at which the distal end of release cable 21 is fixed to collar 27. It should be noted that FIGS. 1-2 are schematic only, and thus for purposes of depiction only, the distal end of wand 20 is below mounting plate 13.

Returning to FIGS. 1-5, lower portion 12 comprises two pairs of expandable locking jaws 41, 42, each pair including two pivoting outwardly curved jaws 41*a*, 41*b* and 42*a*, 42*b*, respectively. Each pair of locking jaws 41, 42 is generally identical to the other, and they lie on opposite sides of a mounting bracket 43. Each pivoting jaw (41*a*, 41*b* and 42*a*, 42*b*) is pivotably attached to mounting bracket 43 at one end. Each pivoting jaw on the same side of the device (such as 42*a*, 42*b* as illustrated in FIGS. 3 and 4) is toothed or otherwise arranged to mate with each other. The other end of each pivoting jaw (41*a*, 41*b* and 42*a*, 42*b*) is also pivotably connected to one end of a pair of linkages 44*a*, 44*b* which are themselves connected to each other and to a central binding post 45. The binding post 45 connects the pairs of linkages 44*a*, 44*b* on opposite sides to each other, and also to connector link 46 (through a hole 46*a*) that permits the reciprocal, vertical movement of each pair of linkages 44*a*, 44*b*. The other, upper end of connector link 46 is connected to central shaft 22 which has extended through central opening 31 in plate 13. The mechanism includes various sleeves, screws, bearings, washers, etc. that function according to their typical principles and therefore are not described further.

The result is that upper portion 11 and lower portion 12 are mechanically connected to each other. More specifically, tension applied to ring 14 will be transferred through central shaft 22 to connector link 46 and thus linkages 44*a*, 44*b*. Thus, tension applied to ring 14 (such as by the bias of spring 23, or by a force pulling on a safety line attached by carabiner or the like clipped to ring 14) pulls central shaft 22 upward and therefore causes both pairs of expandable jaws 41, 42 to widen and lock the mechanism in place, as best seen by comparing FIGS. 3 and 4 (note the difference in location of collar 27 relative to upper mount 24, and also the difference in location of central coupling 45 between the two figures).

This behavior contrasts with the operation of a type of wand anchor which employs an anchor plate as an attachment for the carabiner or other connection to the user, and normally-expanded spring-biased jaws. The anchor plate is not directly coupled to any portion of a mechanism controlling the position of the jaws, i.e, the jaws are pulled together by a cable within the wand shaft during insertion of the jaws into the connection point. Once the jaws are located, the cable is released and the spring biases the jaws into place. While the anchor plate is attached to the apparatus so that it may pivot around the central vertical axis, forces acting on it have no direct influence on the jaws used to hold the device to the connection point. The anchor plate is simply a static connection to the apparatus as a whole, not a contributor to the amount of tension applied to ultimately force the jaws outward and thus secure the apparatus to the connection point.

Figure 8:
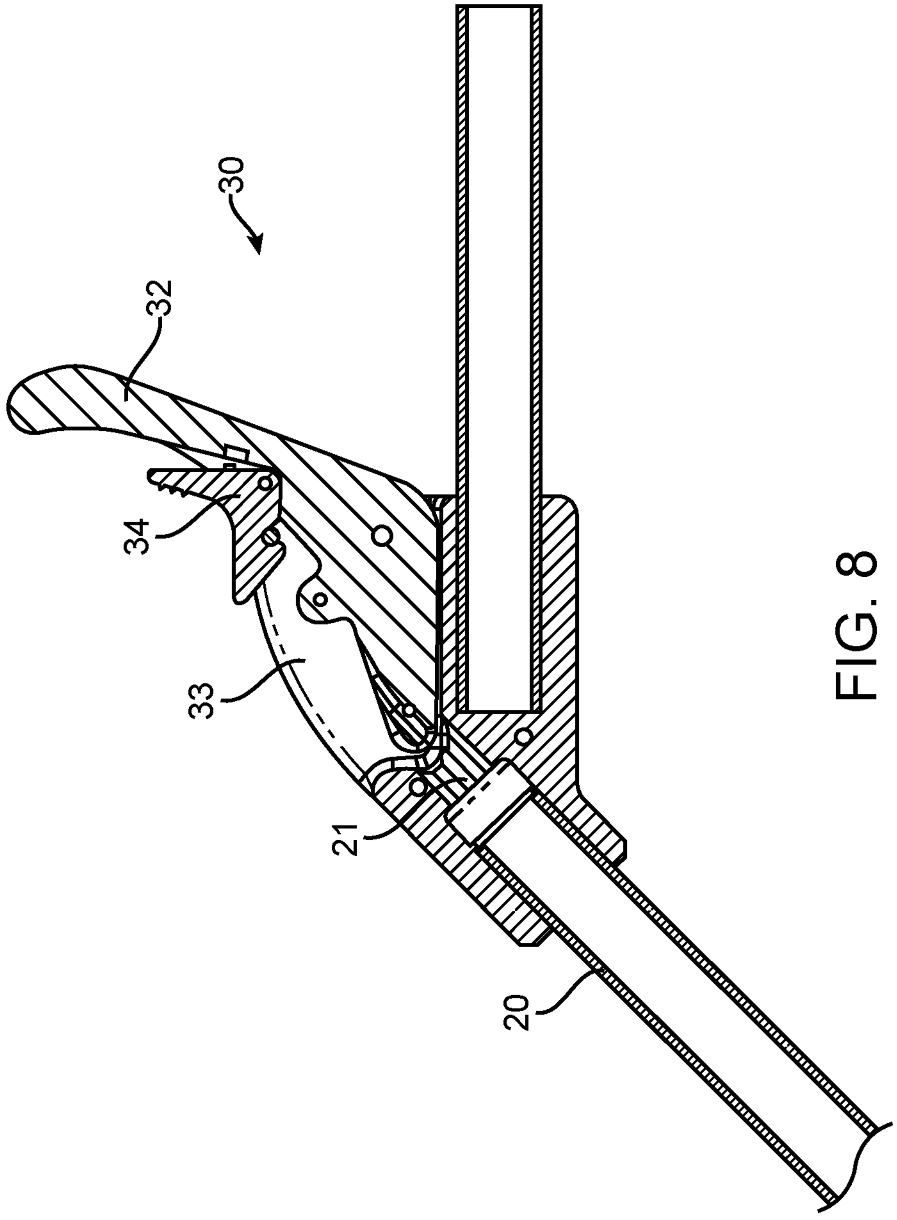
FIG. 8 is an enlarged portion of FIG. 7.

FIG. 8 illustrates a preferred, optional handle 30. As mentioned above, handle 30 is attached to the proximal end of wand 20 and receives release cable 21 from the hollow interior of wand 20. A worker may operate lever 32, to which release cable 21 is attached, to put release cable 21 under tension and thereby overcome the bias of spring 23 to push the pairs of expandable locking jaws 41, 42 into their contracted position as shown in FIGS. 3 and 5. This allows for insertion or removal of the jaws into the connection point, as described above.

Handle 30 also comprises a secondary lock 33 which holds the lever 32 in the locked position when the device is in use. Secondary lock 33 is held against lever 32 to prevent motion of lever 32 by a spring loaded trigger lock 34, which must be depressed prior to the lever 32 being operable.

In an alternative embodiment, the wand 20 and handle 30 are not employed and the anchoring mechanism 10 is inserted manually and then locked by pulling manually on ring 14, as described above. Manually pushing down on the spring, using ring 14, for example, unlocks anchoring mechanism 10. A variation on this embodiment employs a release cable 21, but the cable need not be housed in a wand 20.

What is claimed is:

1. An anchor device, comprising:

a. an anchoring mechanism including a first point for connection of a personal safety line to the anchor device and multiple jaws coupled to each other and operatively connected to the first point to expand by pivoting outwardly when tension is applied to the first point, in which the multiple jaws are pivotally connected to linkages which are pivotally connected to each other and to a central binding post, in which the central binding post connects the linkages to each other and to a connector link to provide reciprocal, vertical movement of the multiple jaws, in which an upper end of the connector link is connected to a central shaft which has extended through a central opening in the anchor device, the anchoring mechanism including an upper portion and a lower portion separated by a mounting plate and mechanically connected to each other; and b. a cable connected to the anchoring mechanism at a second point to expand the multiple jaws when tension is applied to the cable.

2. The anchor device of claim 1, in which the multiple jaws are arranged in two pairs of expandable locking jaws, each of the two pairs including two outwardly curved jaws pivotably connected to each other, such that the tension applied to the first point is transferred to each pair of expandable locking jaws to pivot the outwardly curved jaws away from each other.

3. The anchor device of claim 2, in which each pair of the outwardly curved jaws are on opposite sides of a mounting bracket, each outwardly curved jaw being pivotably attached at one end to the mounting bracket.

4. The anchor device of claim 3, wherein the linkages include a pair of linkages, in which each outwardly curved jaw is further pivotably connected to one of the pair of linkages which are connected to each other and to the central binding post.

5. The anchor device of claim 4, in which the binding post connects each of the pair of linkages to each other and to the connector link to provide reciprocal, vertical movement of each pair of linkages.

6. The anchor device of claim 1, in which tension is applied to the first point by one of: bias of a spring; and force pulling on the personal safety line attached to the first point.

7. The anchor device of claim 1, in which the cable is spring-biased between the first point for connection of the personal safety line and the multiple jaws.

8. The anchor device of claim 1, in which the anchoring mechanism is normally biased against expansion of the multiple jaws to allow insertion of the anchor device into a structure prior to the anchor device being locked by applying tension to the cable.

9. An anchor device, comprising:

a. an anchoring mechanism including a first point for connection of a personal safety line to the anchor device and multiple jaws coupled to each other and operatively connected to the first point to expand by pivoting outwardly when tension is applied to the first point, the anchoring mechanism including an upper portion and a lower portion separated by a mounting plate and mechanically connected to each other, in which the upper portion comprises a ring coupled to a central shaft biased by a spring between a collar and an upper mount; and b. a cable connected to the anchoring mechanism at a second point to expand the multiple jaws when tension is applied to the cable.

10. The anchor device of claim 9, further comprising a central collet underneath the upper mount within a central opening of a mounting plate.

11. The anchor device of claim 9, in which the upper mount is pivotably attached to the mounting plate and pivots in a plane of the mounting plate.

12. The anchor device of claim 9, in which the upper mount accepts a pivotably attached wand and a release cable which passes from an interior of the wand through an interior of the upper mount and then upward along the central shaft.

13. The anchor device of claim 12, in which a distal end of the release cable is fixed to the collar.

14. An anchor device, comprising:

a. a hollow wand;

b. a handle-based mechanism connected to a proximal end of the wand;

c. an anchoring mechanism connected to a distal end of the wand; and d. a release cable connected to the handle-based mechanism to run within the hollow wand until connected to the anchoring mechanism;

in which the anchoring mechanism comprises:

e. an attaching point for a personal safety line; and f. multiple jaws coupled to each other to expand when tension is applied to the attaching point, and to contract when tension is applied to the release cable.

15. The anchor device of claim 14, in which a handle receives the release cable from an interior of the hollow wand.

16. The anchor device of claim 14, in which a lever attached to the release cable puts the release cable under tension.

17. The anchor device of claim 16, in which putting the release cable into tension overcomes bias of a spring to push the multiple jaws into a contracted position to enable insertion of the jaws into a connection point.

18. The anchor device of claim 16, further comprising a secondary lock which holds the lever in a locked position.

19. The anchor device of claim 18, in which the secondary lock is held against the lever to prevent motion of the lever by a spring loaded trigger lock.

20. The anchor device of claim 19, in which the spring loaded trigger lock must be depressed prior to the lever being operable.

21. An anchor device, comprising:

a. an anchoring mechanism including a first point for connection of a personal safety line to the anchor device and multiple jaws coupled to each other and operatively connected to the first point to expand by pivoting outwardly when tension is applied to the first point, in which the multiple jaws are arranged in two pairs of expandable locking jaws, each of the two pairs including two outwardly curved jaws pivotably connected to each other, such that the tension applied to the first point is transferred to each pair of expandable locking jaws to pivot the outwardly curved jaws away from each other, in which each pair of the outwardly curved jaws are on opposite sides of a mounting bracket, each outwardly curved jaw being pivotably attached at one end to the mounting bracket, in which the multiple jaws are pivotally connected to linkages which are pivotally connected to each other and to a central binding post, in which the central binding post connects the linkages to each other and to a connector link to provide reciprocal, vertical movement of the multiple jaws, in which an upper end of the connector link is connected to a central shaft which has extended through a central opening in the anchor device; and b. a cable connected to the anchoring mechanism at a second point to expand the multiple jaws when tension is applied to the cable.

22. An anchor device, comprising:

a. an anchoring mechanism including a first point for connection of a personal safety line to the anchor device and multiple jaws coupled to each other and operatively connected to the first point to expand by pivoting outwardly when tension is applied to the first point, in which the multiple jaws are arranged in two pairs of expandable locking jaws, each of the two pairs including two outwardly curved jaws pivotably connected to each other, such that the tension applied to the first point is transferred to each pair of expandable locking jaws to pivot the outwardly curved jaws away from each other, in which each pair of the outwardly curved jaws are on opposite sides of a mounting bracket, each outwardly curved jaw being pivotably attached at one end to the mounting bracket, the anchoring mechanism including an upper portion and a lower portion separated by a mounting plate and mechanically connected to each other, in which the upper portion comprises a ring coupled to a central shaft biased by a spring between a collar and an upper mount; and b. a cable connected to the anchoring mechanism at a second point to expand the multiple jaws when tension is applied to the cable.

* * * * *